United States Patent [19]

Thomsen et al.

[11] Patent Number: 4,462,209
[45] Date of Patent: Jul. 31, 1984

[54] HYDRAULIC CONTROL MEANS, PARTICULARLY STEERING MEANS

[75] Inventors: Svend E. Thomsen, Nordborg; Erik Kyster, Augustenborg, both of Denmark

[73] Assignee: Danfoss A/S, Nordborg, Denmark

[21] Appl. No.: 351,112

[22] Filed: Feb. 22, 1982

[30] Foreign Application Priority Data

Mar. 2, 1981 [DE] Fed. Rep. of Germany ....... 3107915

[51] Int. Cl.³ .............................................. F16H 39/46
[52] U.S. Cl. ...................................... 60/384; 60/422; 180/132
[58] Field of Search ................... 60/384, 422; 180/132

[56] References Cited

U.S. PATENT DOCUMENTS

| | | | |
|---|---|---|---|
| 3,543,516 | 12/1970 | Treichel | 60/422 |
| 3,566,749 | 3/1971 | Allen et al. | 60/384 X |
| 3,931,711 | 1/1976 | Rau et al. | 60/445 |
| 3,996,742 | 12/1976 | Goff | 60/422 |
| 4,043,419 | 8/1977 | Larson et al. | 180/132 |
| 4,266,464 | 5/1981 | Baatrup et al. | 60/384 X |
| 4,364,302 | 12/1982 | Thomsen et al. | 60/384 X |
| 4,385,674 | 5/1983 | Presley | 60/422 X |

Primary Examiner—Sheldon J. Richter
Attorney, Agent, or Firm—Wayne B. Easton

[57] ABSTRACT

The invention relates to hydraulic control unit for a power steering assembly. The unit is of the type having a metering motor and steering wheel actuated valves for directing metered, pressurized fluid to one selected port of a steering servo-motor and drawing fluid from the other port of the servo-motor to a tank. The invention involves a particular regulating valve for directing pressurized fluid to consumer units when the steering control is in neutral.

8 Claims, 5 Drawing Figures

Fig. 2
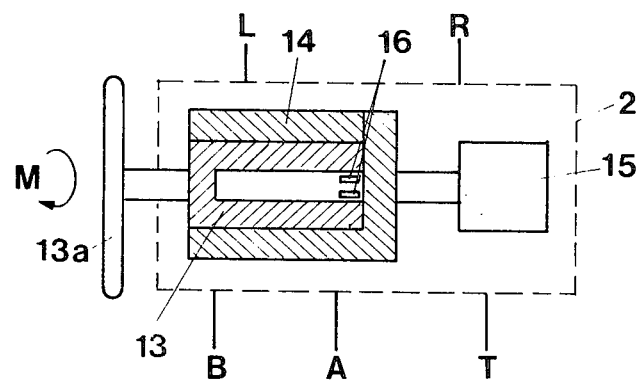
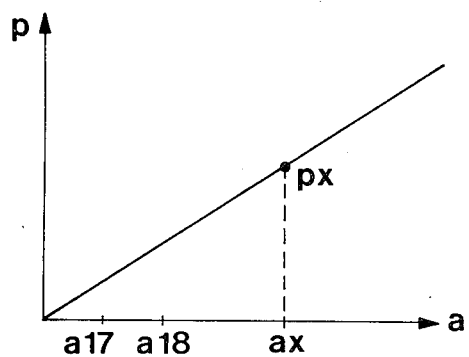
Fig. 4
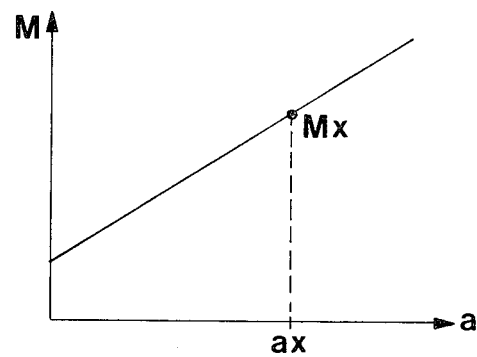
Fig. 5

HYDRAULIC CONTROL MEANS, PARTICULARLY STEERING MEANS

The invention relates to hydraulic control means, particularly steering means, comprising pressure medium supply means having a pump and a regulating valve and comprising a control unit having two valve elements adjustable relatively to each other against the force of a neutral position spring in response to an actuating element and a metering motor, which comprises a first throttle disposed in the supply to a servo-motor, a second throttle disposed in the return from the servo-motor and a third throttle disposed in a branch leading to the tank from upstream of the first throttle and the metering motor, of which the first and second throttles are closed and the third is open in the neutral position, the third throttle being in series with a throttle of constant cross-section and the regulating valve being acted upon depending on the pressure upstream and downstream of the last-mentioned throttle.

In known control means of this kind (U.S. Pat. No. 3,931,711), the throttle of constant cross-section is located in the control unit. It is formed therein by an annular gap between the bore of the housing and an axially adjustable slide. It precedes the third throttle. A control pressure conduit branching from between the two throttles acts on the regulating valve together with the pump pressure in such a way that the pumps deliver a pressure depending on the loading of the servo-motor. However, the accuracy of regulation is detrimentally influenced for several reasons. Since the throttle of constant cross-section is formed by two parts moved relatively to each other during operation, changes in the throttling resistance are unavoidable. The control pressure varies quite considerably with the load on the servo-motor; the leakage losses are correspondingly different, which has a considerable proportional effect on the differential pressure control of the regulating valve. Further, it must be borne in mind that the control unit and the supply means are interconnected by more or less long conduits and the delay caused thereby during transmission of the pressure signals results in time differences between the changes in the pressures acting on the regulating valve, i.e., the pump pressure and the control pressure.

The invention is therefore based on the problem of providing hydraulic control means of the aforementioned kind which permit a higher accuracy in operating the regulating valve.

This problem is solved according to the invention in that the throttle of constant cross-section is downstream of the third throttle and is in the form of a throttle which is fixed during operation.

Since use is made of a throttle which is fixed during operation, its throttling resistance is not subjected to fluctuations. Since the fixed throttle is downstream of the adjustable third throttle and the regulating valve operates so that the pressure drop at this throttle remains substantially constant, the pressures occurring at the regulating valve are comparatively low and substantially maintain their size; consequently, errors caused by leakage losses or even widely different leakage losses are very low. The downstream arrangement of the fixed throttle also ensures that the two pressures derivable therefrom act on the regulating valve by way of substantially equally long conduits and therefore practically simultaneously. All this leads to a very high accuracy of regulation. In addition, the constructional expense is reduced because the installation of the fixed throttle does not have to be adapted to the numerous other functions of the control unit but can be effected at any desired position of the branch and even outside the control unit. Further, a throttle which is fixed during operation is easier to make than a throttle of which the parts move relatively to each other during operation. Since the control pressures are at a lower level, there is also increased safety because there is no fear of a fracture in the control pressure conduits. Because of the counterpressure built up by the fixed throttle, the downstream arrangement of the fixed throttle also reduces noise that could arise in some positions of the third throttle.

With particular advantage, the fixed throttle is disposed in the pressure medium supply means. No connecting conduits or only very short connecting conduits need therefore be provided between this throttle and the regulating valve, thereby resulting in a very high speed of reaction.

It is favourable if the branch passes through the pressure applying chambers of the regulating valve. Since an amount of pressure medium always flows through the branch, there is no zone in which air could separate out and affect the accuracy of regulation.

A useful construction is found to be one in which the regulating valve comprises an axial slide of which one end face is acted upon by the pressure upstream of the fixed throttle and the other end face by the pressure downstream of the fixed throttle and a valve spring.

In this case, it is particularly advisable for the fixed throttle to be disposed in an axial bore of the axial slide. The two pressure applying chambers are therefore connected to the fixed throttle by the shortest distance. The condition is also fulfilled that the branch passes through the pressure applying chambers.

In a further embodiment of the invention, an over-pressure valve should connect the output on the pressure side of the pressure medium supply means to the branch conduit between the third throttle and fixed throttle. This arrangement of the over-pressure valve primarily reduces the undesired excess pressure in that the fixed throttle is supplied with pressure medium by way of the over-pressure valve, whereby the regulating valve assumes a pressure-reducing position.

The amount of pressure medium flowing through the branch can additionally be utilised if an additional consumer is connectible into the branch downstream of the fixed throttle. Although this additional consumer is actuated during operation of the servo-motor, from which the accuracy of regulation suffers, the servo-motor automatically has priority.

When using a pump of constant output, the regulating valve may comprise two oppositely adjustable throttles of which one leads to the control unit and the other to a discharge branch into which a further consumer may be connected. Here, again, the servo-motor has priority. The additional consumer may be connected into the branch and a further consumer in the discharge branch. In this case it is also favourable for all consumers to be connectible to the pressure medium supply means to result in a central application of all connections.

On displacement of the valve elements out of the neutral position, the third throttle should already start to close before the first and second throttles open. This has the advantage that, with the aid of the regulating valve, the pressure at the input of the control unit is increased so that, during opening of the first and second throttles, an adequate operating pressure is available.

Further, it is favourable if, on displacement of the valve elements out of the neutral position, the second throttle opens after the first throttle. This permits a pressure to be built up on the supply side before the return side opens, thereby substantially preventing the servo-motor to be carried along under the influence of external forces.

The invention will now be described in more detail with reference to the drawing showing a preferred example. In the drawings:

FIG. 1 is a diagrammatic circuit of control means according to the invention;

FIG. 2 diagrammatically illustrates the construction of a control unit;

FIG. 4 is a graph of the pump pressure against the relative displacement of the valve elements, and FIG. 5 is a graph of the input torque against the relative position of the valve elements.

Figure 1:
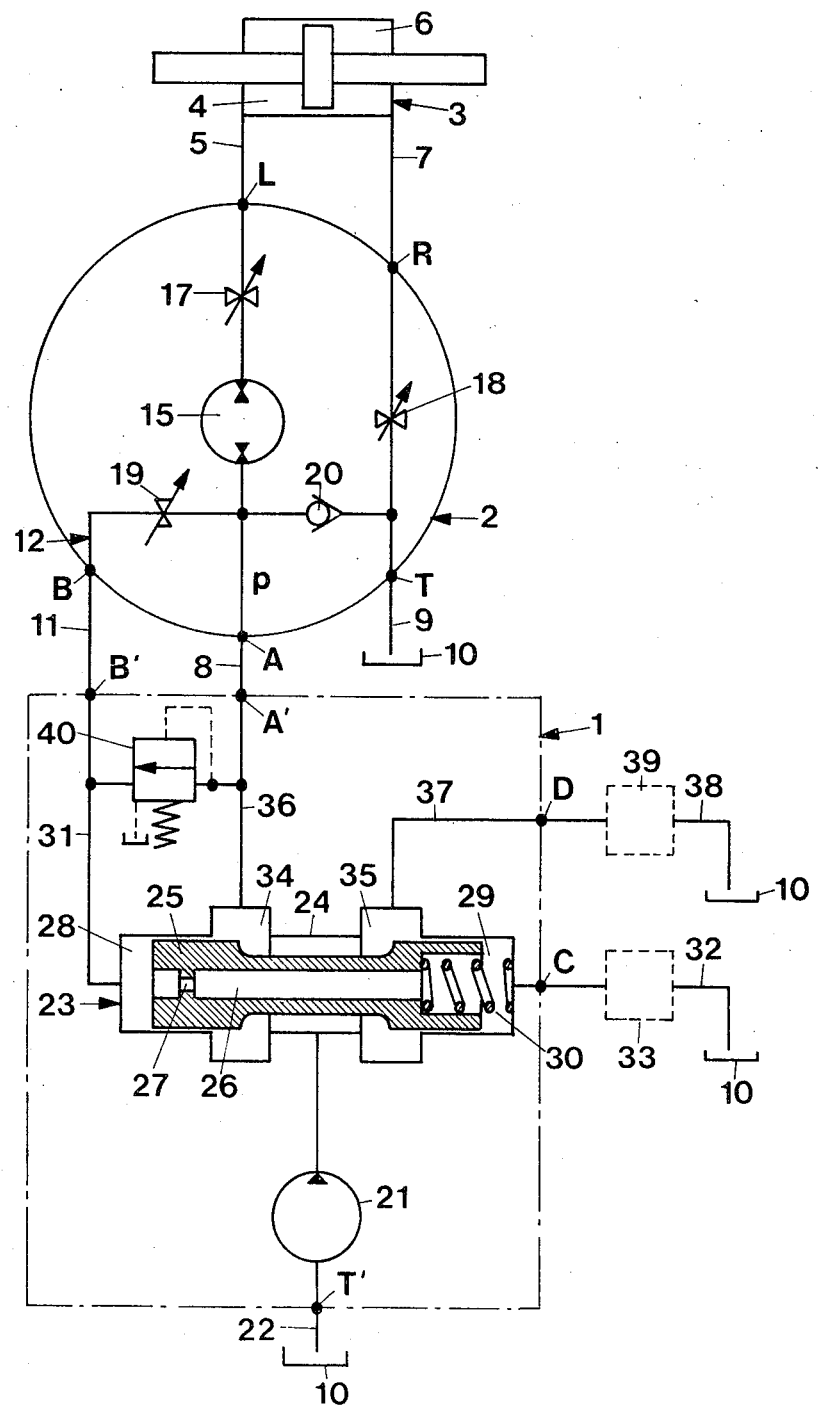

The control means of FIG. 1 comprise pressure medium supply means 1 and a control unit 2 with the aid of which a servo-motor 3 can be supplied with pressure medium. Its operating chamber 4 is connected by a conduit 5 to the connection L and its operating chamber 6 by way of a conduit 7 to the connection R of the control unit 2. The connection A on the pressure side of the control unit 2 communicates by way of a conduit 8 with the connection A' of the supply means 1. The connection T on the outlet side communicates with a tank 10 by way of a conduit 9. In addition, there is a connecting conduit 11 which belongs to a branch conduit 12 and connects the connection B of the control unit 2 to the connection B' of the supply means 1.

The control unit 2 comprises two valve elements 13 and 14 of which the valve element 13 is connected to a manual actuating element 13a and the valve element 14 is rotatably connected to a metering motor 15. The two valve elements are here shown as rotary slides. They are held in their neutral position by two radially extending leaf springs 16 and can turn relatively to each other through an angle a against the force of these neutral position springs 16. The actuating element 13a is turned by hand; the metering motor 15, which is traversed by the pressure medium flowing to the servo-motor 3, serves as a follow-up element. Between the two valve elements 13 and 14 there are a first throttle 17, a second throttle 18 and a third throttle 19. In the neutral position, the throttles 17 and 18 are closed whilst the throttle 19 is open. On rotation out of the neutral position, the throttle 19 closes gradually whilst the throttles 17 and 18 open. The metering motor 15 is in series with the throttle 17 on the supply side. FIG. 1 therefore shows the operation for one direction of rotation. In the opposite direction, the throttles 17 and 18 exchange their functions and the metering motor 15 is connected in series with the throttle 18. A check valve 20 ensures that, in the absence of pressure, emergency control operation may be effected with the aid of the manual actuating element 15.

The pressure medium supply means 1 comprise a pump 21 of which the suction side is connected to the tank 10 by way of a connection T' and a conduit 22. Further, a regulating valve 23 is provided which has an axial slide in a bore 24 of the housing. This axial slide has an axial bore 26 with a fixed throttle 27. This axial bore interconnects the two pressure applying chambers 28 and 29 at the ends. The last-mentioned chamber 29 also contains a valve spring 30. The axial bore 26 communicates by way of a conduit 31 with the connection B' so that a series circuit of the third throttle 19 and the fixed throttle 27 results in the branch. The pressure chamber 29 is connected to the tank 10 by way of a connection C and a conduit 32. This conduit may also have a consumer 33 connected into it. The pump conveys a constant quantity. The axial slide 25 in conjunction with two annular grooves of the housing forms two oppositely acting throttles 34 and 35 of which the first is connected by a bore 36 to the connection A' and the second by a conduit 37 to a connection D which is connected to the tank 10 by a conduit 38 into which a consumer 39 may also be connected. The conduits 36 and 31 are connected by an over-pressure valve 40 which opens when a predetermined pressure is exceeded in the conduit 36.

These control means operate in the following manner. When the control unit 2 is in the neutral position, pressure fluid conveyed by the pump 21 flows through the connecting conduit 8 to the control unit 2 and then to the tank 10 by way of the fully open throttle 19 and the fixed throttle 27 of the branch. The pressure drop at the throttle 27 gives rise to a force on the axial slide 25 equal to the force of the valve spring 30. The regulating valve 23 therefore assumes a position in which an amount of pressure fluid is fed through the throttle 34 into the branch 12 just sufficient for maintaining this valve position. The remainder of the conveyed quantity flows to the tank 10 through the connection D. If, now, an adjustment is desired to be made to the servo-motor 3 and the actuating element 13a is therefore turned, the throttle 19 is throttled. Since a smaller amount of pressure fluid flows through the branch 12, the axial slide 25 is displaced to the left so that the pressure at the output A' increases until a position of equilibrium has again been reached. In themeantime, the throttles 17 and 18 have also opened so that the servo-motor 3 is pushed to the right. The axial slide 25 assumes a position such that the pressure required for feeding the servo-motor and the branch 12 is applied. This principle applies in both directions of rotation. If the pressure in the conduit 36 becomes too large, the over-pressure valve 40 opens, whereby the third throttle 19 is bridged. The axial slide 25 immediately moves to the right whereby the excess pressure is reduced.

In this manner of operation, one obtains a clear relationship between the input torque applied to the actuating element 13a and the pressure p obtaining at the connection A on the pressure side. According to FIG. 4, the pressure p is a function of the relative angle of rotation a between the two valve elements 13 and 14. A particular point px therefore belongs to a particular angular position ax. Further, because of the neutral position spring 16, a particular relative angle of rotation is associated with a particular input torque M. An input torque Mx therefore corresponds to the angle ax. The combination of FIGS. 4 and 5 therefore results in a clear relationship between the input torque M and pressure p. Since this pressure p is predetermined by the external load, the operator obtains information about the size of the load through the actuating element 13a.

FIG. 4 also shows that the throttle on the input side only opens at a relative angle of rotation a17 and the throttle 18 on the return side at a still large angle of rotation a18. This ensures that, on opening the throttle 17 on the supply side, a certain pressure rise has already taken place at the connection A so that, on opening the throttle 17, a sufficiently large operating pressure is immediately available. The delayed opening of the throttle 18 on the return side ensures that the servo-motor 3 will not be carried along as a result of external forces.

Figure 3:
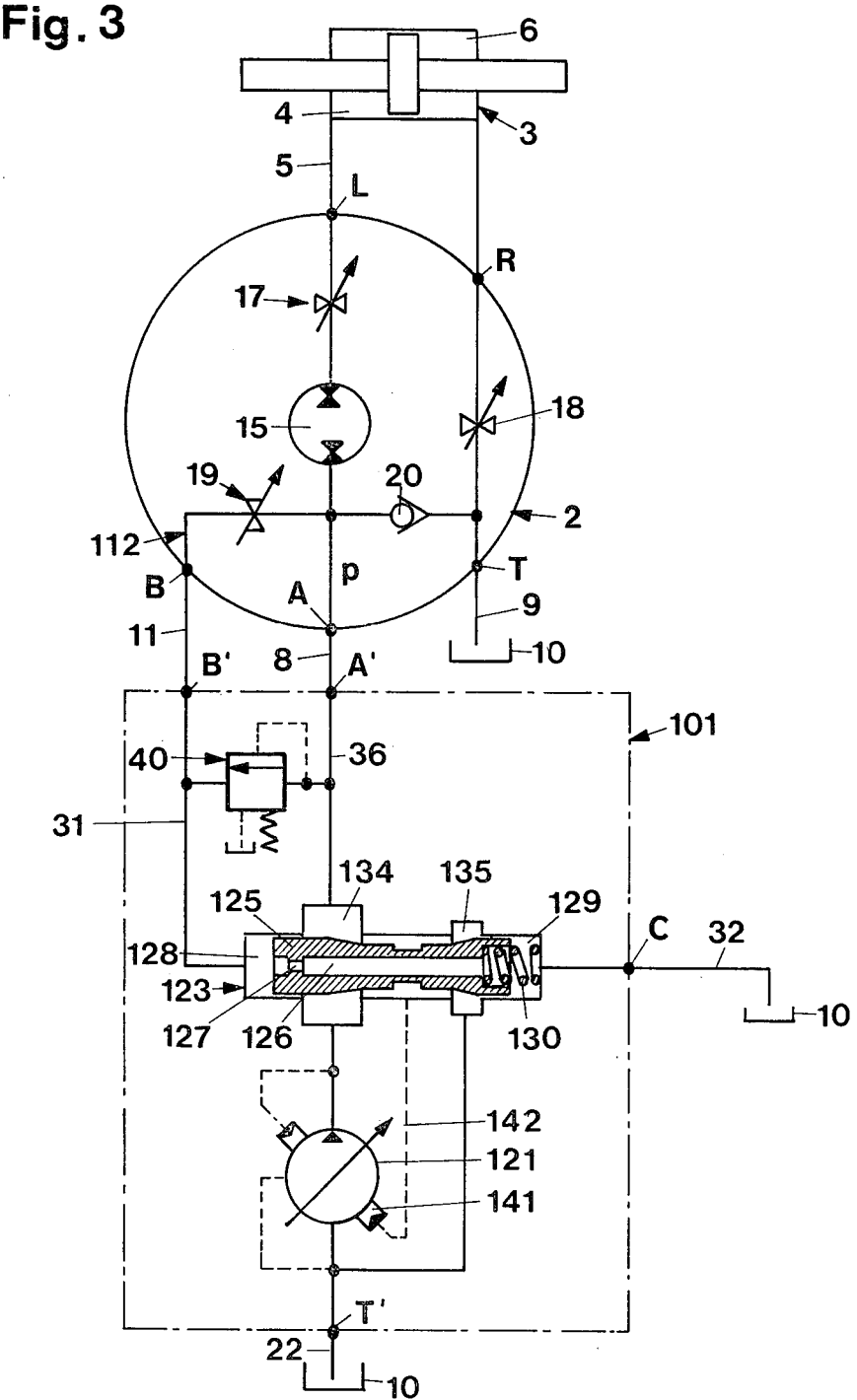
FIG. 3 is a diagrammatic circuit of a modified embodiment of control means according to the invention.

In the embodiment of FIG. 3, identical components are provided with the same reference numerals as in FIG. 1 and corresponding components with a reference numeral increased by 100. In this case, a regulatable pump 121 is provided which has a servo-element 141 operable by a pressure conduit 142. The regulating valve 123 again has an axial slide 125 with an axial bore 126 which comprises a fixed throttle 127 and interconnects the two pressure chambers 128 and 129. Two oppositely operative throttles 134 and 135 are connected in series between the pumps 121 and tank 10. The control pressure conduit 142 branches off between them.

In this construction, the regulating valve 123 again sets itself so that a constant amount of pressure fluid flows through the branch 112 to the tank 10, which means that the pump 121 is set so that it will always make the required pressure p available at the connection A of the control unit 2 at the pressure side.

The valve elements may form a rotary slide or an axial slide arrangement. They may be controlled in any known manner and combined at will with known metering motors.

We claim:

1. Hydraulic control means for a steering unit servo-motor, comprising, pressure medium supply means having a pump, a regulating valve connected to said pump having a valve body forming oppositely acting steering and consumer throttling, said valve body having a fixed size control throttle, tank means, a control unit having an actuating element and a metering motor, said control unit having neutral position spring means and two throttle valve elements adjustable relatively to each other against the force of said means in response to oppositely acting effects of said actuating element and said metering motor, a first throttle controlled by said valve elements disposed between said metering motor and said servo-motor, a second throttle controlled by said valve elements between said servo-motor and said tank means, a third throttle controlled by said valve elements disposed in a branch leading to said regulating valve from a point upstream of said metering motor, said first and second throttles being closed when said third throttle is open in the neutral position, said third throttle being in series with said regulation valve body fixed size throttle whereby said regulating valve is acted upon depending on the pressure upstream and downstream of said fixed throttle.

2. Control means according to claim 1, wherein said regulating valve comprises spring means and an axial slide of which one end face is acted upon by the pressure upstream of said fixed size throttle thereof and the other end face by the pressure downstream of said fixed size throttle and said spring means.

3. Control means according to claim 2, wherein said fixed throttle is disposed in an axial bore of said axial slide.

4. Control means according to claim 1 wherein an over-pressure valve is between said third throttle of said control unit and said fixed size control throttle of said regulating valve.

5. Control means according to claim 1 wherein an additional consumer is connected downstream of said regulating valve fixed size throttle.

6. Control means according to claim 1 wherein said pump has a constant output.

7. Control means according to claim 1 wherein on displacement of said first and second throttles out of the neutral position said third throttles starts to close before said first and second throttles open.

8. Control means according to claim 7 wherein on displacement of said two valve elements out of the neutral position said second throttle opens after said first throttle.

* * * * *